United States Patent
Bhambhani Godhwani et al.

(10) Patent No.: US 10,118,123 B2
(45) Date of Patent: Nov. 6, 2018

(54) PROCESS FOR THE REMOVAL OF HEAT STABLE SALTS FROM ACID GAS ABSORBENTS

(75) Inventors: Vijay Bhambhani Godhwani, Montreal (CA); John Nicholas Sarlis, Montreal (CA)

(73) Assignee: SHELL OIL COMPANY, Houston, TX (US)

( * ) Notice: Subject to any disclaimer, the term of this patent is extended or adjusted under 35 U.S.C. 154(b) by 1546 days.

(21) Appl. No.: 13/634,569

(22) PCT Filed: Mar. 17, 2011

(86) PCT No.: PCT/EP2011/054051
§ 371 (c)(1),
(2), (4) Date: Jan. 30, 2013

(87) PCT Pub. No.: WO2011/113897
PCT Pub. Date: Sep. 22, 2011

(65) Prior Publication Data
US 2013/0193375 A1    Aug. 1, 2013

Related U.S. Application Data

(60) Provisional application No. 61/314,689, filed on Mar. 17, 2010.

(30) Foreign Application Priority Data

Mar. 18, 2010 (EP) .................... 10156848

(51) Int. Cl.
*B01D 53/14* (2006.01)
*B01J 20/20* (2006.01)
*B01J 39/08* (2017.01)

(52) U.S. Cl.
CPC ..... *B01D 53/1425* (2013.01); *B01D 53/1493* (2013.01); *B01J 20/20* (2013.01); *B01J 39/08* (2013.01); *B01D 2251/21* (2013.01); *B01D 2251/30* (2013.01); *B01D 2251/304* (2013.01); *B01D 2251/40* (2013.01); *B01D 2257/302* (2013.01)

(58) Field of Classification Search
None
See application file for complete search history.

(56) References Cited

U.S. PATENT DOCUMENTS

| | | | |
|---|---|---|---|
| 3,658,462 A | 4/1972 | Van Scoy | 23/2 |
| 3,664,930 A | 5/1972 | Pottiez et al. | 203/37 |
| 4,113,849 A | 9/1978 | Atwood | 423/574 |
| 4,122,149 A | 10/1978 | Dunnery et al. | 423/242 |
| 4,970,344 A | 11/1990 | Keller | 564/497 |
| 5,045,291 A | 9/1991 | Keller | 423/228 |
| 5,292,407 A | 3/1994 | Roy et al. | 204/101 |
| 5,368,818 A | 11/1994 | Cummings et al. | 422/62 |
| 5,738,834 A | 4/1998 | Deberry | 422/177 |
| 5,788,864 A | 8/1998 | Coberly et al. | 210/670 |
| 6,245,128 B1 | 6/2001 | George, Jr. | 95/186 |
| 2004/0253159 A1 | 12/2004 | Hakka et al. | 423/228 |

FOREIGN PATENT DOCUMENTS

| | | | | |
|---|---|---|---|---|
| EP | 0815922 | 1/1998 | | B01D 53/50 |
| EP | 1886991 | 2/2008 | | C07C 215/02 |
| GB | 1118687 | 7/1968 | | C07C 85/16 |
| WO | WO 9832519 | 7/1998 | | B01D 53/14 |

OTHER PUBLICATIONS

Kohl, A; "Mechanical Design and Operation of Alkanolamine Plants"; Gas Purification; 5th Edition; pp. 242-263; 1997.

*Primary Examiner* — Tanisha Diggs

(57) ABSTRACT

A process for the regeneration of an acid gas absorbent comprising an amine and heat stable salts by phase separation, comprising a) mixing the acid gas absorbent with an alkaline solution, to form a mixture with a pH above the pH equivalence point of the amine; b) cooling the mixture to a temperature below 500 C; c) separating the mixture into a regenerated acid gas absorbent and a waste stream; d) collecting the regenerated acid gas absorbent separate from the waste stream.

14 Claims, No Drawings

PROCESS FOR THE REMOVAL OF HEAT STABLE SALTS FROM ACID GAS ABSORBENTS

PRIORITY CLAIM

The present application claims priority from PCT/EP2011/054051, filed 17 Mar. 2011, which claims priority from U.S. provisional application 61/314,689, filed 17 Mar. 2010 and European application 10156848.3, filed 18 Mar. 2010.

FIELD OF THE INVENTION

This invention relates to the regeneration of acid gas absorbents comprising an amine and heat stable salts.

BACKGROUND OF THE INVENTION

In order to remove $SO_2$ from gaseous streams, it is known to utilize a process with regenerable aqueous amine absorbents. The absorbent is exposed to a gas stream to absorb $SO_2$ from the gas stream and to produce an $SO_2$ lean treated gas stream and a spent absorbent containing amine $SO_2$ salts. The amine $SO_2$ salts in the spent absorbent are decomposed in the regenerator tower of the process to gaseous $SO_2$ and the corresponding free base amine under elevated temperature and stripping steam traveling up the regeneration column, countercurrent to the spent absorbent flowing downwards.

However, in commercial operation, acid gas capture processes experience ingress and/or generation in process of acids that are stronger than the acids for which the removal process is designed. These stronger acids form salts with the amine solvent which are not regenerable with steam and are termed heat stable amine salts (HSAS), or heat stable salts (HSS). If sodium cations enter the solvent either through intentional addition or unintentional means such as carry-over in a mist, the sodium, being a stronger base than the amine, will remove anions from the amine and form HSS.

If the heat stable amine salts are allowed to accumulate, they will eventually neutralize all the amine of the solvent, rendering it unable to react with and remove the acid gas component as intended. Accumulation of sodium salts can eventually reach their solubility limit, causing undesirable precipitation of solids in the process. Therefore, as it is known in the art, means for removal of heat stable amine salts are either installed as a part of the process or available on demand.

Various means and processes for removal of heat stable salts from amine gas treating solutions are known. These include distillation of the free amine away from the salt at either atmospheric or subatmospheric pressure (see for example "Gas Purification", 5$^{th}$ edition, Arthur Khol, Gulf Publishing Co, 1997, pages 255 to 263). The disadvantage of distillation is that it is very energy consuming. Other methods include electrodialysis, as described in for example U.S. Pat. No. 5,292,407, and ion exchange. Ion exchange is for example described in U.S. Pat. No. 6,245,128. It describes the reclamation of spent aqueous alkanolamine solutions by contacting the spent solution with a strong base ion exchange resin. After a high concentration of ions accumulate on the resin, the strong base ion resin needs to be regenerated by purging the resin with water, followed by contacting the resin with a sodium chloride solution for a time sufficient to remove the ions. Then the resin is again purged, followed by contacting the resin with a solution with sodium hydroxide to convert the resin to the hydroxide form and again purging the resin. Other examples of processes for the removal of heat stable salts can be found in for example U.S. Pat. No. 4,122,149; U.S. Pat. No. 4,113,849; U.S. Pat. No. 4,970,344; U.S. Pat. No. 5,045,291; U.S. Pat. No. 5,292,407 and U.S. Pat. No. 5,368,818. One of the disadvantages of removal of heat stable salts via electrodyalysis or via ion exchange is that significant amounts of liquid waste are being generated. Another disadvantage is that the losses of process amines are significant.

In GB-A-1118687 a process is described for the recovery of amines from amine degradation products, wherein the solution comprising the amine degradation products are being contacted with an alkaline compound, with such an amount that phase separation into a purified amine-rich phase and an aqueous phase comprising potassium salt is affected. The process is preferably performed at temperatures between 100-125° C. to free certain amine complexes formed. According to GB-A-1118687 a further advantage of temperatures between 100-125° C. is that in practice amine solutions generally have a temperature in this range after the regeneration step in which amine salts of acidic gases are decomposed. The regenerated solutions need not be cooled or heated to apply the process.

A disadvantage of GB-A-1118687 is that distillation is required to reduce the water content of the amine solution before the reaction with the alkaline compound can take place.

Although progress has been made in the regeneration of absorbents by the removal of heat stable salts, there still remains a need for a process that allows higher concentrations of heat stable salts to be removed.

SUMMARY OF THE INVENTION

We have now surprisingly found that the removal of heat stable salts can be efficiently performed by mixing the absorbent with an alkaline solution, followed by phase separation. The present invention therefore provides a process for the regeneration of an acid gas absorbent comprising an amine and heat stable salts by phase separation, comprising a) mixing the acid gas absorbent with an alkaline solution, to form a mixture with a pH above the pH equivalence point of the amine; b) cooling the mixture to a temperature below 50° C.; c) separating the mixture into a regenerated acid gas absorbent and a waste stream; d) collecting the regenerated acid gas absorbent separate from the waste stream. The process has a low loss of acid gas absorbent and little dilution of the absorbent that is recovered during the regeneration process. The regenerated absorbent can be re-used very easily in an acid gas recovery unit. The process according to the invention reduces significantly the generation of liquid waste, compared to the known processes for removal of heat stable salts from amine absorbents, such as ion exchange or electrodialysis. An additional advantage is that the process requires minimal equipment and instrumentation. Yet another advantage is that higher concentrations of heat stable salts in the absorbent can be handled with the process according to the invention.

DETAILED DESCRIPTION OF THE INVENTION

The process according to the inventions aims at complete removal of the heat stable salts (HSS) from the absorbent. With the complete removal of the salts is being meant that at least 70%, based on the total amount of salts present, is being removed, more preferably at least 90%, even more preferably at least 95% is being removed. The process is preferably a batch process, and suitably applied in the bulk heat stable salt removal. With bulk is being meant that the absorbent comprises at least 10 wt % of heat stable salts in the absorbent, based on the total weight of absorbent and salts, more preferably at least 15 wt %. The amount of sulfate present in the acid gas absorbent is preferably in the range of from 10 to 25 wt %, more preferably in the range of from 10 to 20 wt %, even more preferably in the range of from 13 to 16 wt % based on the total weight of the acid gas absorbent. During the process of the invention, part of the amine present in the original absorbent, might be lost. Furthermore, the regenerated acid gas absorbent might comprise up to 5 wt % of alkali metal, more preferably up to 3 wt % of alkali metal, even more preferably up to 1 wt % of alkali metal, based on the total weight of absorbent and alkali metal. The alkali metal present in the absorbent might be present as dissolved sulfate salt.

Heat Stable Salts (HSS) include Heat Stable Amine Salts (HSAS) and any other inorganic salt such as sodium sulfate that cannot be regenerated through steam stripping. Heat Stable Amine Salts (HSAS) are defined as compounds formed when a strong acid like for example sulfuric acid, hydrochloric acid or hydrofluoric acid neutralizes the amine functionality of the amine absorbent. The resulting HSS compound is said to be heat stable since the anion of the strong acid cannot be separated from the amine via stream stripping. Generally, there are a number of acid sources responsible for the increase of the HSS concentration in the absorbent. One of the sources is acid mist contamination: a feed gas containing acid mist will form HSS when contacted with amine. This might be prevented by a well designed gas conditioning unit or prescrubber that can eliminate the majority of acid mist before contact with the amine. Another source might be sulfite and bisulfite oxidation. Sulfite and/or bisulfite reacts with oxygen and produces sulfuric acid, which produces HSS. A third source might be the disproportionation of $SO_2$ to HSS. When the amine is subjected to high sulfite and/or bisulfite concentrations and temperatures in excess of 70° C., disproportionation of SO2 to HSS might occur.

The purpose of the process of the present invention is the regeneration of an acid gas absorbent. The acid gas absorbent is preferably an aqueous amine solvent, more preferably a diamine solution. Even more preferably, the acid gas absorbent is a solution comprising N-(2-hydroxyethyl)piperazine or N,N'-bis-(hydroxyethyl)piperazine or a combination thereof. The amount of amine is preferably in the range of from 15 up to 40 wt %, more preferably of from 20 up to 35 wt %, even more preferably of from 23 up to 27 wt % of amine based on the total weight of the aqueous amine solvent.

In the most preferred form, the acid gas absorbent comprises in the range of from 13 up to 16 wt % of sulfate, in the range of from 23 up to 27 wt % of the amine and in the range of from 57 up to 64 wt % of water, in such amounts that the total equals 100 wt %. With this composition of the acid gas absorbent, the best separation will take place at temperatures below 50° C. of the mixture formed after addition of the alkaline solution, giving a maximum of regenerated acid gas absorbent.

The process according to the inventions aims at completely separating the amine molecule from the anion by neutralizing the anion with a stronger base, in this case an alkaline solution. Preferably, the alkaline solution comprises a Group I or a Group II metal hydroxide, more preferably potassium or sodium hydroxide, even more preferably sodium hydroxide. Sodium hydroxide is the most preferred, since generally, sodium is already present in the system. With sodium hydroxide, no new ions are introduced into the system, resulting in the least variation of ions.

The pH of the absorbent is increased by addition of the alkaline solution, from its starting pH of preferably in the range of from 4-6 up to a pH of above the pH equivalence point of the amine present in the absorbent. With pH equivalence point of the amine is being meant the pH at which 99% of the amine is in its free base form. The pKa and the equivalence points (e.point) of a number of amines are given below.

| Amine | pKa1 | pKa2 | e. point |
|---|---|---|---|
| N-(2-hydroxyethyl)piperazine | 4.3 | 8.9 | 10.9 |
| N,N'-bis-(hydroxyethyl)piperazine | 3.9 | 8.0 | 10.0 |
| 1,4-diazabicyclo[2.2.2]octane | 3.2 | 8.9 | 10.9 |
| 2-aminomethyl pyridine | 3.1 | 8.5 | 10.5 |
| 2-(2aminoethyl) pyridine | 3.8 | 9.5 | 11.5 |

There are several methods to measure equivalence points, as known by the person skilled in the art, like for example acid-base titration, colorimetry, conductimetry, pH-metry and amperometry. The equivalence points of the amines as given above were determined using acid-base titration.

Once neutralized, the anion forms an inorganic salt and the amine an organic base. In principle, it is an acid-base neutralization reaction. The following simplified chemical equation describes the main reaction, in the preferred case that the heat stable salt is formed out of a reaction of an amine with a sulfur compound and the alkaline solution comprises for example sodium hydroxide:

$$RNH_3^+ - HSO_4^- + 2NaOH \rightarrow Na_2SO_4 + 2H_2O + RNH_2 \quad (1)$$

The main products of the chemical reaction described in equation (1) are an aqueous solution of sodium sulfate and free base amine. Other side products possible, in the preferred case that the alkaline solution comprises sodium hydroxide, are sodium sulfite, sodium chloride, sodium fluoride and sodium thiosulfate, depending on the presence of these components in the untreated amine.

The reaction described by Equation (1) is exothermic. The heat generated is 44.5 KJ/mol NaOH in the preferred case that NaOH is being used as alkaline solution. The heat generated is 57.6 KJ/mol KOH in the preferred case that KOH is being used as alkaline solution. The alkaline solution comprises preferably in the range of from 25 up to and including 60 wt % of Group I or a Group II hydroxide, more preferably in the range of from 30 up to and including 50 wt % of Group I or a Group II hydroxide, based on the total weight of the solution.

The partition into the organic amine (product) and aqueous salt (waste) phases occurs best at a pH range between 11 and 12. On the low end of this range, this is dictated by the equivalence point of the amine, and on the high end by the solubility limit of sodium hydroxide in the final mixture. Thus, to enhance separation of the heat stable salts from the acid gas adsorbent, the pH of the absorbent is increased by addition of the alkaline solution, from its starting pH of preferably in the range of from 4-6 up to a pH of above the pH equivalence point of the amines present in the absorbent. The mixture that is thus formed has a pH value of above the pH equivalence point of the amines present in the absorbent, preferably a pH in the range of from 10 to 13, more preferably in the range of from 11 to 12.

At a pH below the equivalence point of the amine, no phase separation occurs. At a pH between 10 and 11, partial phase separation may occur with a portion of the amine remaining bound to the HSS and lost to waste. At a pH above 13, the concentration of sodium hydroxide in the final mixture is high enough that it might result in precipitation of sodium sulfate and sodium hydroxide solids. The solid salt might be deposited in the pipe spool downstream of the caustic injection point. This would be indicated by an increase in pressure as recorded by the pressure gauge on the feed pump discharge line. If solid buildup is suspected, the line may be steamed with low pressure steam until the solids are dissolved. As a result, it is thus preferred that alkaline solution addition to the absorbent might be limited to a target pH in the range of from 11-12 for the final mixture. If the pH is higher than 12, additional absorbent might be introduced in the tank to lower the pH of the mixture formed.

The separation of the mixture into the organic amine layer and the aqueous salt solution is dictated by the mutual solubility of these phases. This solubility is a function of temperature. To enhance separation of the mixture into two distinctive phases, the mixture needs to be cooled to a temperature below 50° C. At temperatures above 50° C., no sufficient separation into the layers will take place, to recover the acid gas absorbent. It is furthermore preferred to keep the temperature above 15° C. At temperatures below 15° C., precipitation of the formed group I or II metal sulfate might take place, because the solubility of the sulfate compound formed is low. Preferably, the mixture is cooled to a temperature in the range of from 15 to 50° C., more preferably in the range of from 20 to 45° C., even more preferably of from 25 to 40° C. Above 50° C., the two phases separate but the solubility of the phases is such that a significant amount of amine and sodium sulfate are present in the inorganic waste and organic amine phases respectively. It is thus more preferred to have the mixture at a temperature in the range of from 25 to 40° C.

Separating of the mixture into a regenerated acid gas absorbent and a waste stream is preferably being performed by leaving the mixture undisturbed for at least 30 minutes. By undisturbed is being meant that any form of actively mixing has been stopped. Once the mixture has been allowed to separate for preferably at least 30 minutes, the regenerated acid gas absorbent and the waste water comprising the inorganic Group I or II salt(s) are seen to segregate into two distinctive phase solutions. Below 30 minutes, the process of separation of the phases might still be ongoing. Preferably, settling takes place in the range of from 1 hour to 10 hours, more preferably of from 1 hour to 3 hours. After 10 hours or more, it might be that the supersaturated solution starts a process of crystallization of sodium sulfate, disrupting the liquid-liquid phase equilibrium. During this settling time, two phases should develop: an amine phase preferably 'floating' over an inorganic aqueous phase. This is due to its lower mass density. The two phases can therefore be separated via for example decantation on a lab scale. On industrial scale, where mixing takes preferably place in a stirred tank reactor, the regenerated acid gas absorbent is preferably removed from the reactor by pumping it out of the tank from the side.

Thus, preferably, the present invention provides a process for the regeneration of an acid gas absorbent comprising an amine and heat stable salts by phase separation, comprising: a) mixing the acid gas absorbent with an alkaline solution, to form a mixture with a pH above the pH equivalence point of the amine; b) cooling the mixture to a temperature in the range of from 15 to 50° C.; c) leaving the mixture to allow separation into two distinctive phases for at least 30 minutes, the two phases being a regenerated acid gas absorbent and a waste stream; d) collecting the regenerated acid gas absorbent separate from the waste stream.

The solubility of one phase on the other is dictated by the phase equilibrium. Specifically, although the product amine contains preferably a minimum of heat stable amine salts, it will contain a small concentration of aqueous sodium sulfate. With small concentration is being meant up to 6 wt % of sodium sulfate. Similarly, the inorganic (waste) aqueous phase will preferably be virtually saturated in sodium salts, but will also contain a small concentration of amine. With small concentration here is being meant up to 10 wt % of amine.

The process is operated as such, that it aims to maximize the sulfate removal and minimize the amine loss into the inorganic (waste) phase, while minimizing the Group I or II alkali metal retained in the acid gas absorbent.

The process is preferably operated in a stirred tank reactor. The stirred tank reactor preferably comprises an additional recirculation loop to further improve mixing of the components. The stirred tank reactor might be coupled to a utility heat exchanger, to regulate the temperature of the content of the reactor to the set point value in the range of from 15 to 50° C.

The regenerated acid gas absorbent collected in step d) of the process is an amine solvent preferably containing in the range of from 20 to 40 wt % amine, preferably up to 6 wt % sodium sulfate and water. The presence of the Group I or II metal compound in the acid gas absorbent might increase the freezing point of the absorbent. This might be a particular issue where the absorbent is exposed to low temperature conditions for prolonged periods of time (ie. unit shutdown during winter).

In some cases it is thus advantageous to after treat the regenerated acid gas absorbent for a further reduction of its Group I or II metal compound. In GB-A-1118687 after treatment is being done via filtration with a clay at 20° C. GB-A-1118687 describes further that after treatment can be done with carbon dioxide, and cooling down the amine solution to 20° C.

The removal of the Group I or Group II metal compound from the regenerated acid gas absorbent might be additionally performed in an extra step e) of the process. Preferably, this additional step e) might be implemented via cationic ion exchange. The amine in the acid gas absorbent is in free base form and as a result will not be removed by the cationic ion exchange sites. This maximizes the Group I or Group II metal compound removal efficiency of the ion exchanger, and minimizes solvent losses.

The regenerated acid gas absorbent may be further treated in an optional step f) with activated carbon for the removal of hydrocarbons and other impurity profoamers. These profoamers typically come with the flue gas and may accumulate in the acid gas absorbent. Activated carbons are usually filters or meshes made of carbon fibers which are treated with chemical functionalities in order to enhance their affinity for hydrocarbon molecules or other profoamer species. The activated carbon units may also consist in cartridge containing carbon beads activated with chemical functionalities.

It is also possible to perform the treatment with activated carbon before the regeneration of the acid gas absorbent comprising heat stable salts. It has been seen in the past that the Group I or Group II metal compound concentration, preferably sodium concentration, in the absorbent, in addition to other profoamer species, has an effect on the foaming tendency of the absorbent. It is therefore another possibility to combine step e) and step f) in one step, to resolve foaming issues.

The regenerated acid gas absorbent collected in step d) of the process may optionally comprise some sulfate particulates that remained in suspension during the regeneration of the absorbent, due to for example wrong operation of the system. Moreover, some particulates may optionally be entrained by the flue gas and accumulate in the absorbent once the flue gas is being treated with the absorbent. Therefore, it is sometimes required to perform filtration and/or microfiltration downstream of the regeneration process, in an optional step g). Microfiltration comprises passing the solvent through a filter with very small size pores (typically from 1 to 100 micrometers in diameter). Several examples of filtration processes can be found in the literature (Gas Purification, 5th Edition, Arthur Kohl, Gulf Pub. Co, 1997, pp. 242-250).

The following examples will illustrate the invention.

EXAMPLE 1

An amount of 10 liter of acid gas absorbent, comprising 20 wt % of N,N'-bis-(hydroxyethyl)piperazine, 2.7 wt % Na+ and 15.1 wt % sulfate in water was transferred into a 20 Liter stainless steel reactor vessel. An alkaline solution comprising 50 wt % of NaOH was added gradually to bring the pH up to 12. Constant stirring of the mixture formed during the caustic addition and afterwards ensured a homogenous mixture and allowed for the heat generated to dissipate (maximum solvent temperature was maintained below 50° C. by slow caustic addition). Once at a pH of 12 and a temperature of 35° C., stirring was stopped and the solution was allowed to settle for 4 hours. An organic phase containing most of the amine was formed and separated from an aqueous phase containing most of the sodium sulfate. Analysis showed over 95% sulfate removal. The organic phase contained the majority of the amine at a concentration of 40 wt %.

EXAMPLE 2

The below described set of experiments were performed to study the effect of settling time, separation pH and HSS concentration on the performance of the process of the present invention in terms of HSS removal, amine loss and sodium retention.

The experiments were performed in a 500 mL graduated cylinder submerged in a 35° C. heated water bath. This allowed a constant temperature to be maintained throughout the experiment. An amount of 400 ml of acid gas absorbent, comprising sulfate, sodium, HSS and N,N'-bis-(hydroxyethyl)piperazine was added to this cylinder. An alkaline solution comprising 30 or 50 wt % sodium hydroxide was then gradually added to bring the pH up to the desired value, ensuring constant stirring with a rod. At this point, the solution was allowed to settle for 1 to 3 hours enabling the two phases to separate. Samples were drawn from the organic acid gas absorbent layer and the aqueous layer. Two syringes fitted with a needle were used to extract from the side of the cylinder the samples without physically disturbing the phases. Samples were analyzed for sodium, amine, water and sulfate contents.

The experimental conditions and the results for all experiments performed are shown in Table 1 below.

Table 1 shows that for Experiment #1, the settling time had little or no effect on the efficiency of sulfate removal or the amine loss, with all other operating conditions maintained constant. This indicates that phase equilibrium has been reached after 1 hour of settling time.

A comparison of Experiments #1 and #2, carried out at a pH of 11.0 and 11.7 respectively, indicates no benefit in terms of sulfate removal efficiency or amine loss at the higher pH condition. This can be explained by the fact that the equivalence point of the amine is at a pH value of approximately 10.0, which means that any neutralization beyond this point has little effect on the equilibrium potential phase behavior of the system. As a result, performing the phase separation at a pH of 11.0 is beneficial in minimizing sodium retention in the amine and the quantity of caustic used.

Experiments #2, #3, and #4 provide a comparative basis for the study of the effect of HSS concentration on the net sulfate removal efficiency: the higher the starting amine heat stable salt concentration, the higher the sulfate removal efficiency. This is consistent with a higher ionic strength aqueous phase yielding a stronger 'salting out' effect in the phase separation. As a simplification, the ionic strength is assumed to be proportional to the net sodium sulfate concentration of the homogeneous mixture, after caustic addition and before phase separation. A fraction of the amine treated using the process of the invention is lost in the aqueous (waste) phase. The higher the ionic concentration, the lower the percent amine loss using the process according to the invention.

TABLE 1

Overview of the experimental conditions and the resulting sulfate removal, amine loss and sodium removal.

| | | | Experiment Number | | | | | | |
|---|---|---|---|---|---|---|---|---|---|
| | | | 1 | | | 2 | 3 | 4 | 5 |
| | PH | pH units | 11 | 11 | 11 | 11.7 | 11 | 11 | 12 |
| | Temperature | ° C. | 35 | 35 | 35 | 35 | 35 | 35 | 35 |
| | Settling Time | hours | 1 | 2 | 3 | 1 | 2 | 2 | 2 |
| Starting amine solution | Sulfate | wt % | 12.5 | 12.5 | 12.5 | 12.5 | 13.4 | 14.1 | 16.2 |
| | Sodium | wt % | 1.6 | 1.6 | 1.6 | 1.6 | 1.4 | 1.4 | 2.9 |
| | Amine | wt % | 25 | 25 | 25 | 25 | 25 | 24 | 22 |
| | HSS | eq/mol | 1.29 | 1.29 | 1.29 | 1.30 | 1.49 | 1.61 | 1.64 |
| Caustic used | NaOH | wt % | 30 | 30 | 30 | 30 | 30 | 30 | 50 |
| Homogeneous Mixture | [$Na_2SO_4$] | wt % | 14.7 | 14.9 | 14.5 | 15.0 | 14.9 | 15.2 | 23.0 |
| Sulfate Removal | % | | 70% | 69% | 70% | 69% | 76% | 80% | 95% |

TABLE 1-continued

Overview of the experimental conditions and the resulting sulfate removal, amine loss and sodium removal.

|  |  | Experiment Number | | | | |
|---|---|---|---|---|---|---|
|  |  | 1 | 2 | 3 | 4 | 5 |
| Amine Loss | % | 24% 23% 26% | 20% | 23% | 20% | 2% |
| Sodium Removal | % | −28% −28% −33% | −33% | −30% | −20% | 68% |

What is claimed is:

1. A process for the regeneration of an acid gas absorbent comprising an amine and heat stable salts by phase separation, comprising:
   a) mixing the acid gas absorbent with an alkaline solution, to form a mixture with a pH above the pH equivalence point of the amine, wherein the acid gas absorbent comprises in the range of from 15 up to 40 wt % of amine based on the total weight of the acid gas absorbent;
   b) cooling the mixture to a temperature below 50° C.;
   c) separating the mixture into a regenerated acid gas absorbent and a waste stream; and
   d) collecting the regenerated acid gas absorbent separated from the waste stream.

2. A process according to claim 1, wherein step c) is performed by leaving the mixture undisturbed for at least 30 minutes to allow separation of the regenerated acid gas absorbent and the waste stream.

3. A process according to claim 1, wherein the acid gas absorbent is an aqueous amine solvent.

4. A process according to claim 1, wherein the acid gas absorbent comprises in the range of from 10 to 25 wt % of sulfate based on the total weight of the acid gas absorbent.

5. A process according to claim 1, wherein the acid gas absorbent comprises in the range of from 13 up to 16 wt % of sulfate, in the range of from 23 up to 27 wt % of the amine and in the range of from 57 up to 64 wt % of water, in such amounts that the total equals 100 wt %.

6. A process according to claim 1, wherein the alkaline solution comprises a Group I or a Group II hydroxide.

7. A process according to claim 1, wherein the mixture has a pH in the range of from 10 to 13.

8. A process according to claim 1, wherein mixing takes place in a stirred tank reactor.

9. A process according to claim 8, wherein the stirred tank reactor furthermore comprises a recirculation loop.

10. A process according to claim 1, wherein the mixture is cooled to a temperature in the range of from 20 to 45° C.

11. A process according to claim 1, wherein a top layer comprises the regenerated acid gas absorbent and a bottom layer comprises the waste stream.

12. A process according to claim 6, wherein the regenerated acid gas absorbent is further treated according to the following step:
   e) treating the regenerated acid gas absorbent via cationic ion exchange to remove a Group I or Group II metal compound present in the regenerated absorbent.

13. A process according to claim 12, wherein the regenerated acid gas absorbent is further treated according to the following step:
   f) treating the regenerated acid gas absorbent with activated carbon to remove at least hydrocarbons.

14. A process according to claim 13, wherein the regenerated acid gas absorbent is further treated according to the following step:
   g) passing the regenerated acid gas absorbent through a filtration and/or microfiltration unit.

* * * * *